United States Patent [19]

Shirai et al.

[11] Patent Number: 5,678,915

[45] Date of Patent: Oct. 21, 1997

[54] EASY-TO-ASSEMBLE AIMING MECHANISM FOR VEHICLE LAMPS

[75] Inventors: Katutada Shirai; Yoshio Suehiro; Hironori Tsukamoto, all of Shimizu, Japan

[73] Assignee: Koito Manufacturing Co., Ltd., Tokyo, Japan

[21] Appl. No.: 562,451

[22] Filed: Nov. 24, 1995

[30] Foreign Application Priority Data

Nov. 24, 1994 [JP] Japan ................................. 6-312416
Sep. 18, 1995 [JP] Japan ................................. 7-262042

[51] Int. Cl.⁶ ........................................................ B60Q 1/06
[52] U.S. Cl. ............................ 362/61; 362/289; 362/428; 362/66
[58] Field of Search .......................... 362/61, 66, 287, 362/428, 273, 289, 284, 427; 33/365, 376, 288

[56] References Cited

U.S. PATENT DOCUMENTS

| | | | |
|---|---|---|---|
| 5,003,436 | 3/1991 | Yamada et al. ................... | 362/61 |
| 5,067,056 | 11/1991 | Suzuki et al. ..................... | 362/66 |
| 5,197,794 | 3/1993 | Scott et al. ........................ | 362/66 |
| 5,197,799 | 3/1993 | Dehaene ........................... | 362/66 |
| 5,546,283 | 8/1996 | Ohtsuka et al. .................. | 362/66 |

*Primary Examiner*—Thomas M. Sember
*Attorney, Agent, or Firm*—Sughrue, Mion, Zinn, Macpeak & Seas, PLLC

[57] ABSTRACT

A reflector with an electric lighting bulb mounted thereto is coupled to a lamp body via a ball-and-socket connection and a vertical and a horizontal aiming screw. Each aiming screw comprises a threaded shank engaged with a nut on the back of the reflector, a journal joined to the threaded shank and rotatably received in a bearing sleeve formed on the lamp body, and a head portion joined to the journal and projecting rearwardly from the bearing sleeve. The aiming screw is formed to include two collars for engaging the bearing sleeve therebetween and so the aiming screw is restrained from axial displacement relative to the sleeve. The diameters of the various parts of the aiming screw and of the bearing sleeve are so determined in relation to one another that, in the assemblage of the headlamp, the aiming screw can be inserted, with its head portion foremost, into and through the bearing sleeve from inside the lamp body, either before or after coupling the aiming screw to the reflector via the nut.

10 Claims, 13 Drawing Sheets

EASY-TO-ASSEMBLE AIMING MECHANISM FOR VEHICLE LAMPS

BACKGROUND OF THE INVENTION

This invention relates generally to electric lamps, and particularly to those for use on motor vehicles such as, typically, headlamps. Still more particularly, the invention pertains to improvements in aiming mechanisms for aiming and retaining headlamps or the like in the proper position with respect to the vehicle.

Aimable headlamps may be divided into two broad designs according to the member to be tilted, both vertically and horizontally, for aiming the headlamp. In one such design the complete headlamp unit, comprising an electric lighting bulb, a reflector and a lens, is tilted relative to the vehicle or to the lamp housing fixed to the vehicle. The other design is such that only the reflector, together with the bulb mounted thereto, is tilted within a lighting chamber defined by a lamp body and a lens which are coupled to each other and which are fixed to the vehicle.

A typical aiming mechanism comprises a pivotal connection such as a ball-and-socket joint which is coupled, in the case of a tiltable reflector headlamp, between the reflector and the lamp body, and a horizontal and a vertical aiming screw also extending therebetween. The tightening or loosening of the horizontal aiming screw, spaced horizontally from the pivotal connection, results in the tilting of the reflector about a vertical axis passing through the pivotal connection and the vertical aiming screw.

The manipulation of the vertical aiming screw, spaced vertically downwardly from the pivotal connection, results in the tilting of the reflector about a horizontal axis passing through the pivotal connection and the horizontal aiming screw.

A problem has been encountered in assembling headlamps incorporating such aiming mechanism of conventional design. Each aiming screw has been inserted into and through a hole in the lamp body from behind the lamp body, that is, from outside the lighting chamber, for threaded engagement with a nut on the back of the reflector. Rotatably supported on the lamp body, the aiming screws have their exposed rear ends manipulated for aiming the headlamp.

An objection to such conventional aiming screws is that the screws have had to be turned into threaded engagement with the nuts on the reflector after having been inserted in and through the holes in the lamp body from its rear or outer side. This has been no easy task, adding considerable time and labor to the assemblage of headlamps, because the threaded ends of the aiming screws and the nuts on the reflector are both invisible from outside the lamp body. The aiming screws have been so made, however, that it has been impossible to first turn the aiming screws into threaded engagement with the nuts and then to insert the screws in and through the holes in the lamp body.

SUMMARY OF THE INVENTION

The present invention seeks to make materially easier than heretofore the assemblage of an aimable vehicle lamp of the kind defined, particularly in regard to the aiming mechanism.

Stated briefly, the present invention concerns an aimable vehicle headlamp of the type having a lamp body and a lens coupled together to define a lighting chamber, a reflector disposed in the lighting chamber and having a light source mounted thereto, a pivotal connection between the lamp body and the reflector, and first and second aiming means for tilting the reflector relative to the lamp body in two orthogonal directions. The invention is directed more specifically to the first and the second aiming means each comprising nut means on the reflector, a bearing sleeve formed on the lamp body, and an aiming screw rotatably supported by the bearing sleeve and engaged with the nut means. The bearing sleeve has an inner end open to the lighting chamber and a constricted outer end directed away from the lighting chamber, at least the constricted outer end of the bearing sleeve being elastically deformable in a radially outward direction. The aiming screw comprises a threaded shank disposed in the lighting chamber and threadedly engaged with the nut means on the reflector, a journal joined to the threaded shank and rotatably received in the bearing sleeve, and a head portion joined to the journal and projecting from the constricted outer end of the bearing sleeve, the head potion having a diameter not greater than the inside diameter of the bearing sleeve. Two collars are formed on the aiming screw, one between the threaded shank and the journal and having a diameter greater than the inside diameter of the bearing sleeve, and the other between the journal and the head portion and having a diameter not greater than the inside diameter of the bearing sleeve and greater than the inside diameter of the constricted outer end of the bearing sleeve.

Thus, in assembling the headlamp, each aiming screw can be inserted, with its head portion foremost, in and through one of the bearing sleeves on the lamp body from its from or inner side. The aiming screw is automatically restrained from axial displacement in either direction relative to the lamp body simply as it is pushed into the bearing sleeve until this sleeve becomes caught between the two collars.

The aiming screws may therefore be first coupled to the reflector via the nut means and then mounted as above to the lamp body. In a preferred embodiment of the present invention to be disclosed subsequently, however, the nut means are so constructed that it is also possible to couple the adjusting screws to the reflector via the nut means after first mounting the adjusting screws to the lamp body. Either way, since the aiming screws are mounted to the lamp body from its front or inner side, instead of from its rear or outer side, the invention thoroughly overcomes the difficulties heretofore encountered in engaging the aiming screws with the nuts.

The above and other features and advantages of this invention and the manner of realizing them win become more apparent, and the invention itself will best be understood, from a study of the following description and appended claims, with reference had to the attached drawings showing a preferred embodiment of the invention.

Figure 1:
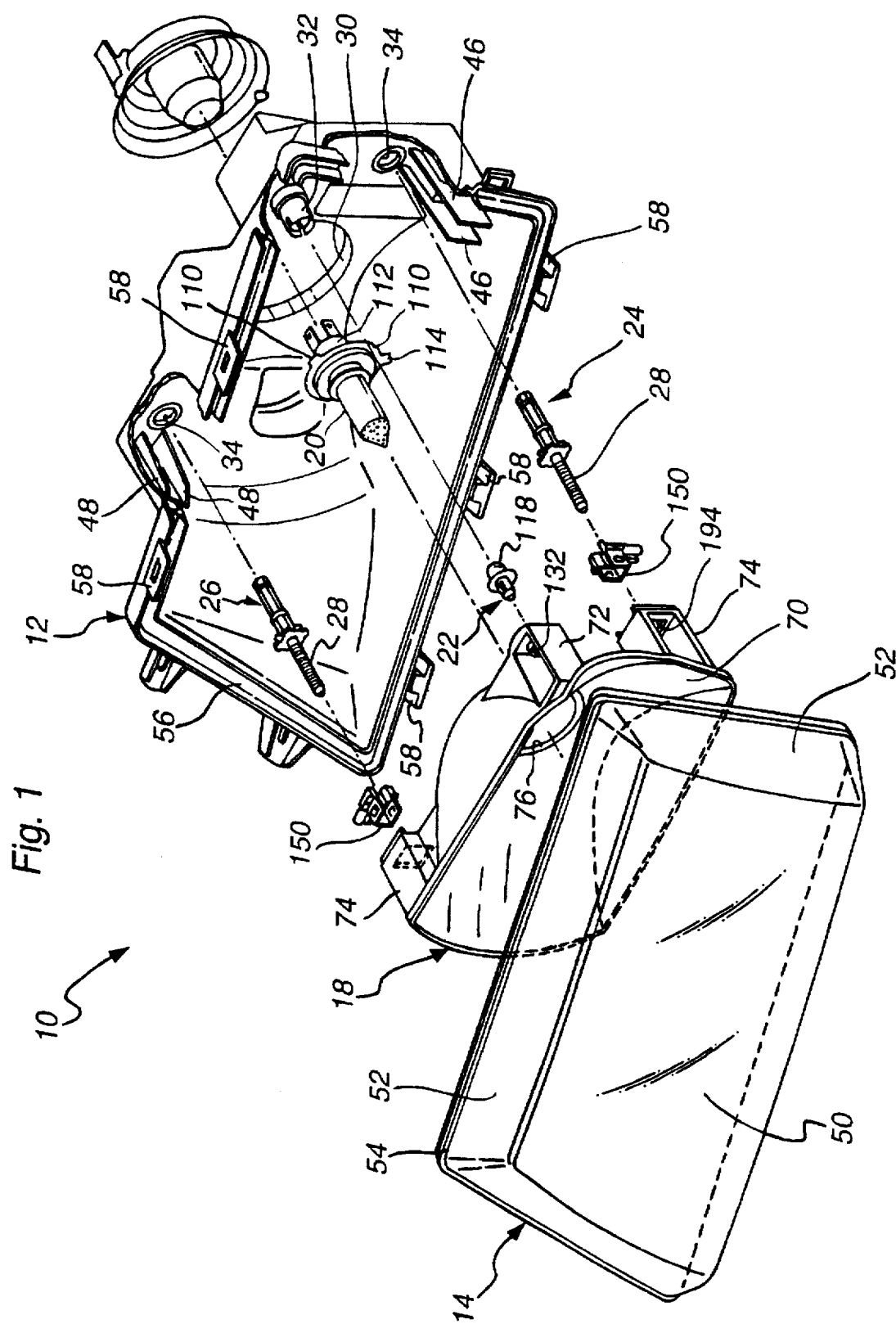
FIG. 1 is an exploded perspective view, partly shown broken away to reveal other parts, of a preferred embodiment of an aimable motor vehicle headlamp according to the present invention.
Figure 6:
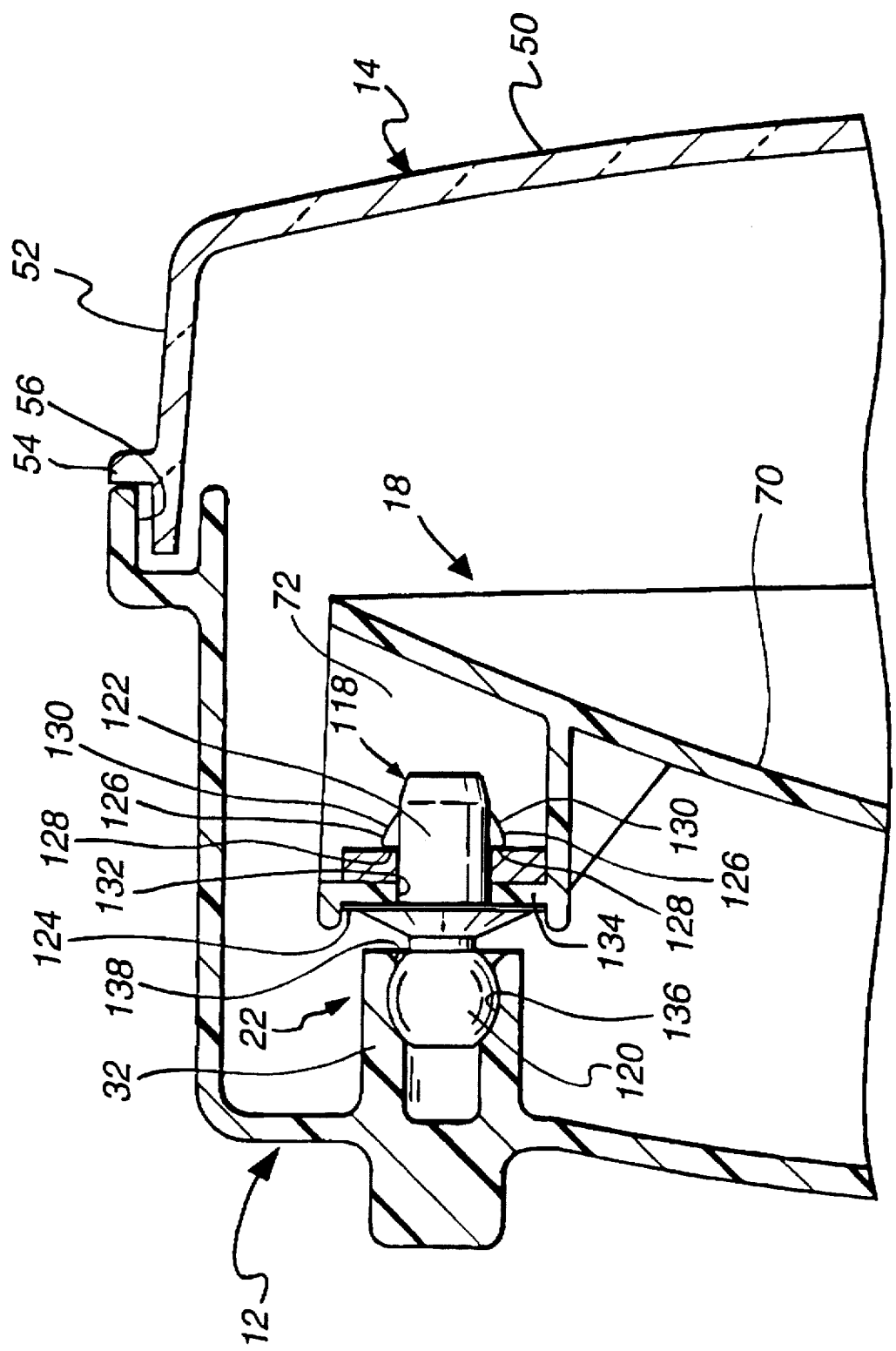
FIG. 6 is another enlarged, fragmentary vertical section through the headlamp, taken along the line VI—VI in FIG.
Figure 7:
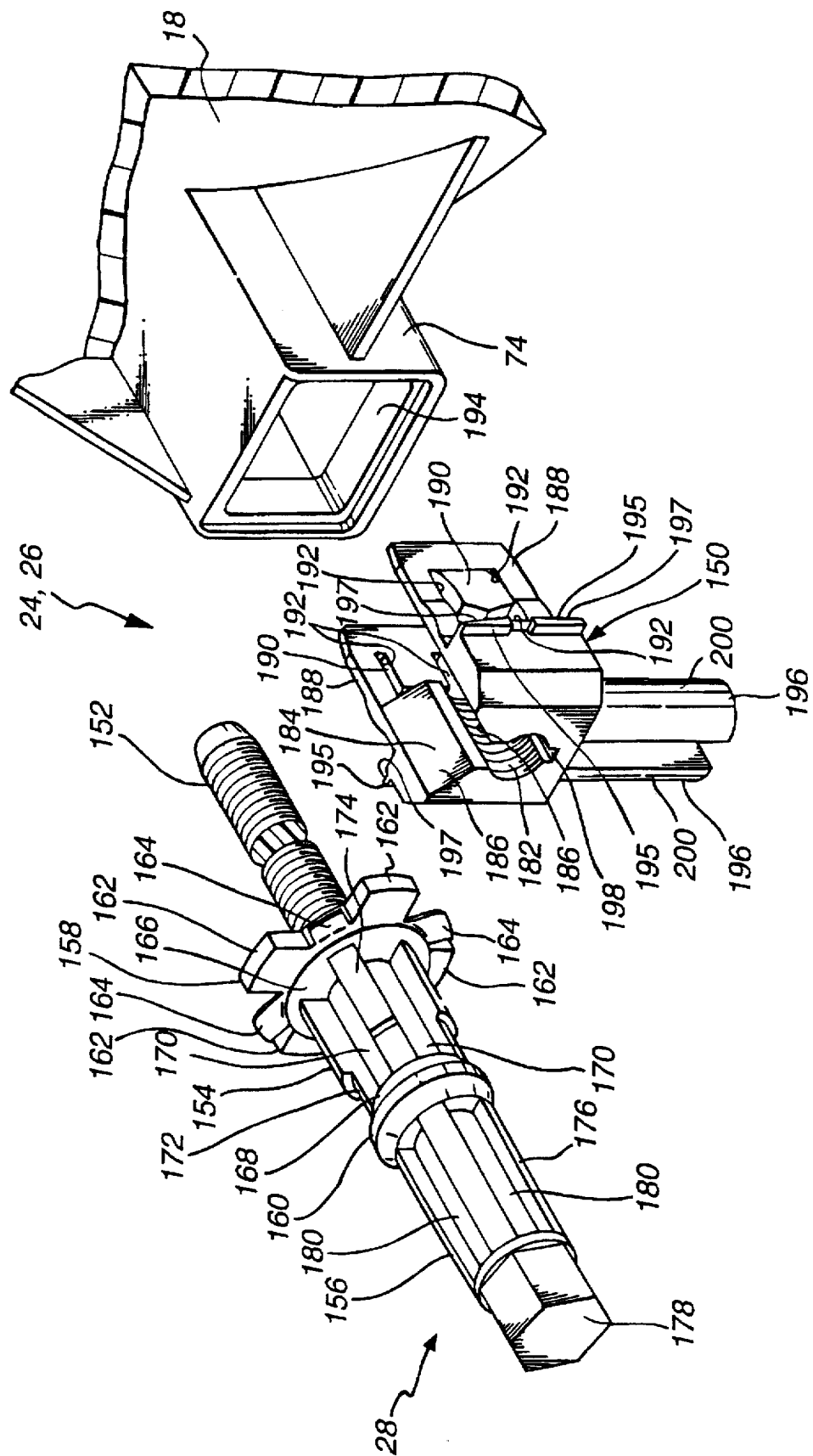
Figure 8:
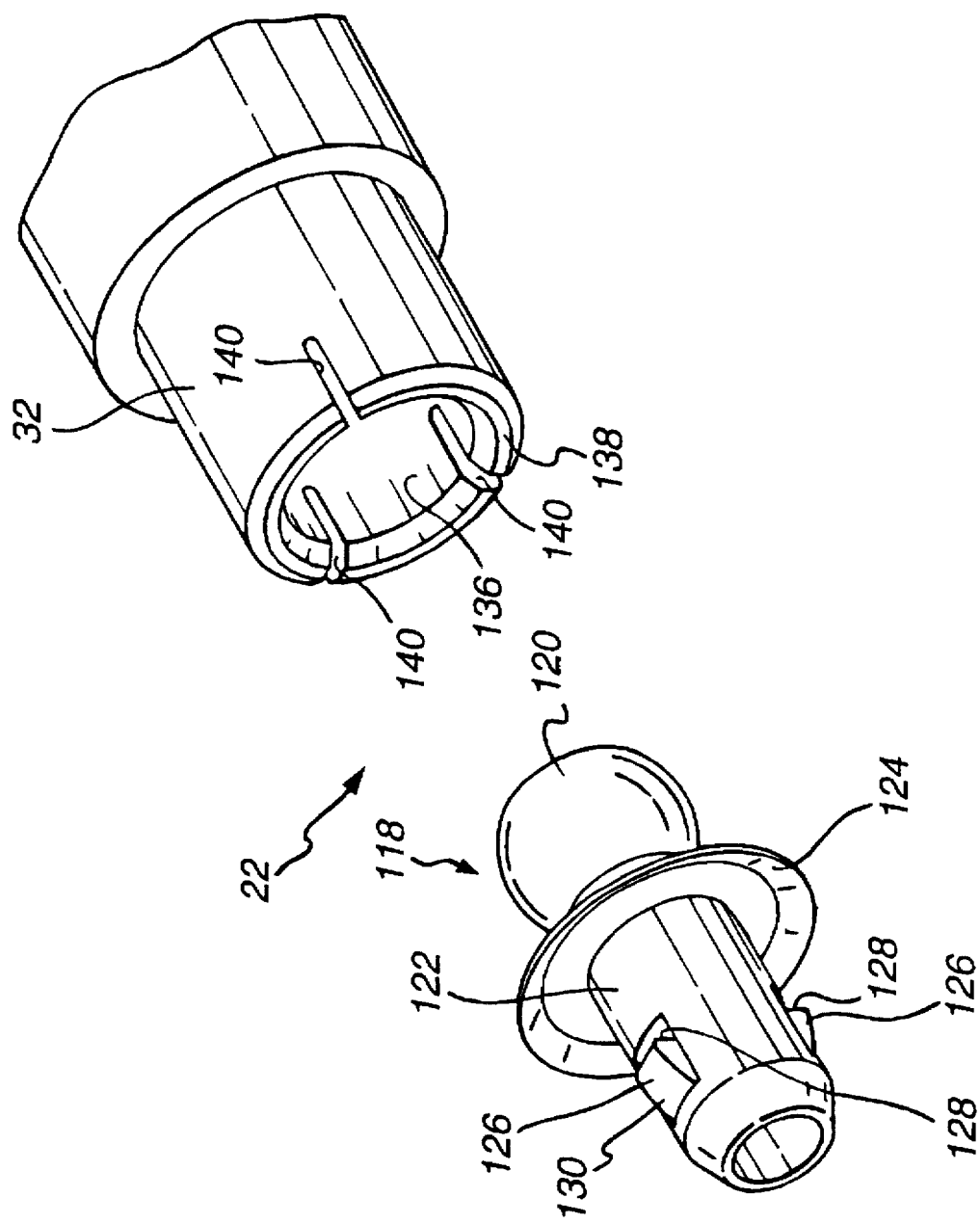
Figure 9:
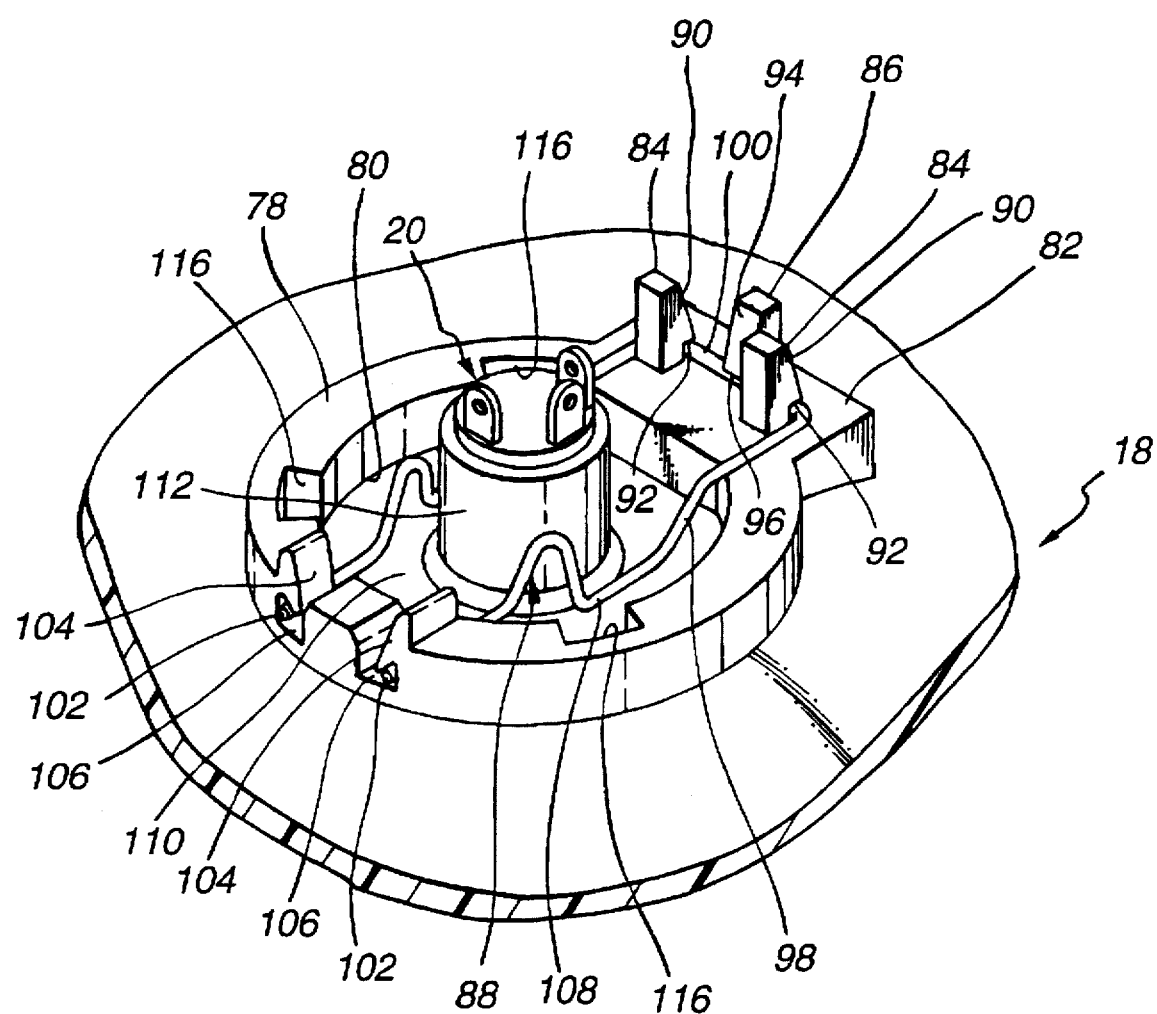
Figure 10:
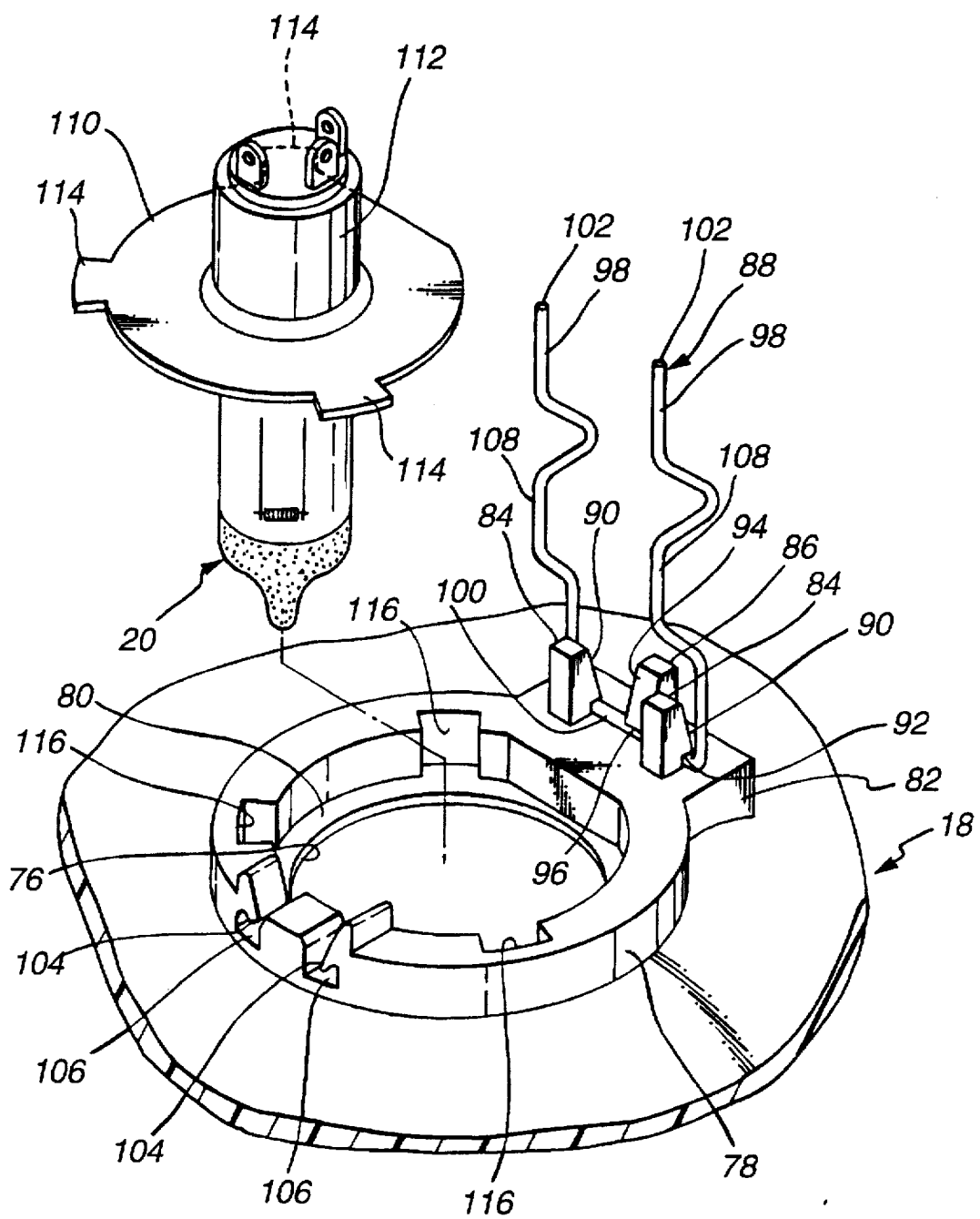
Figure 11:
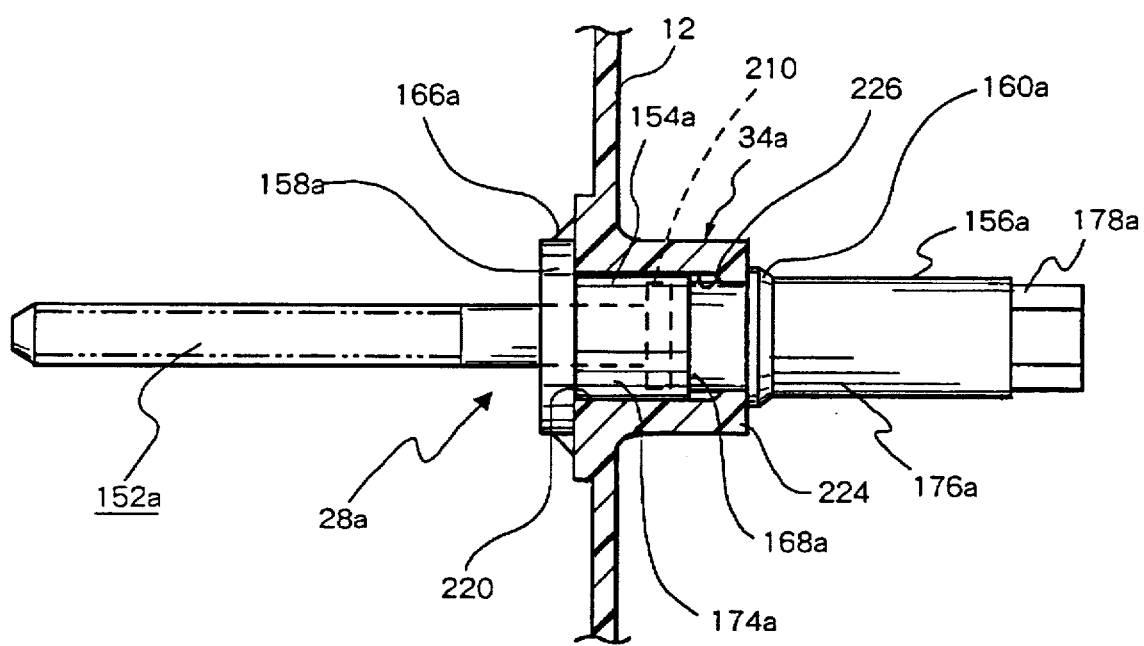
Figure 12:
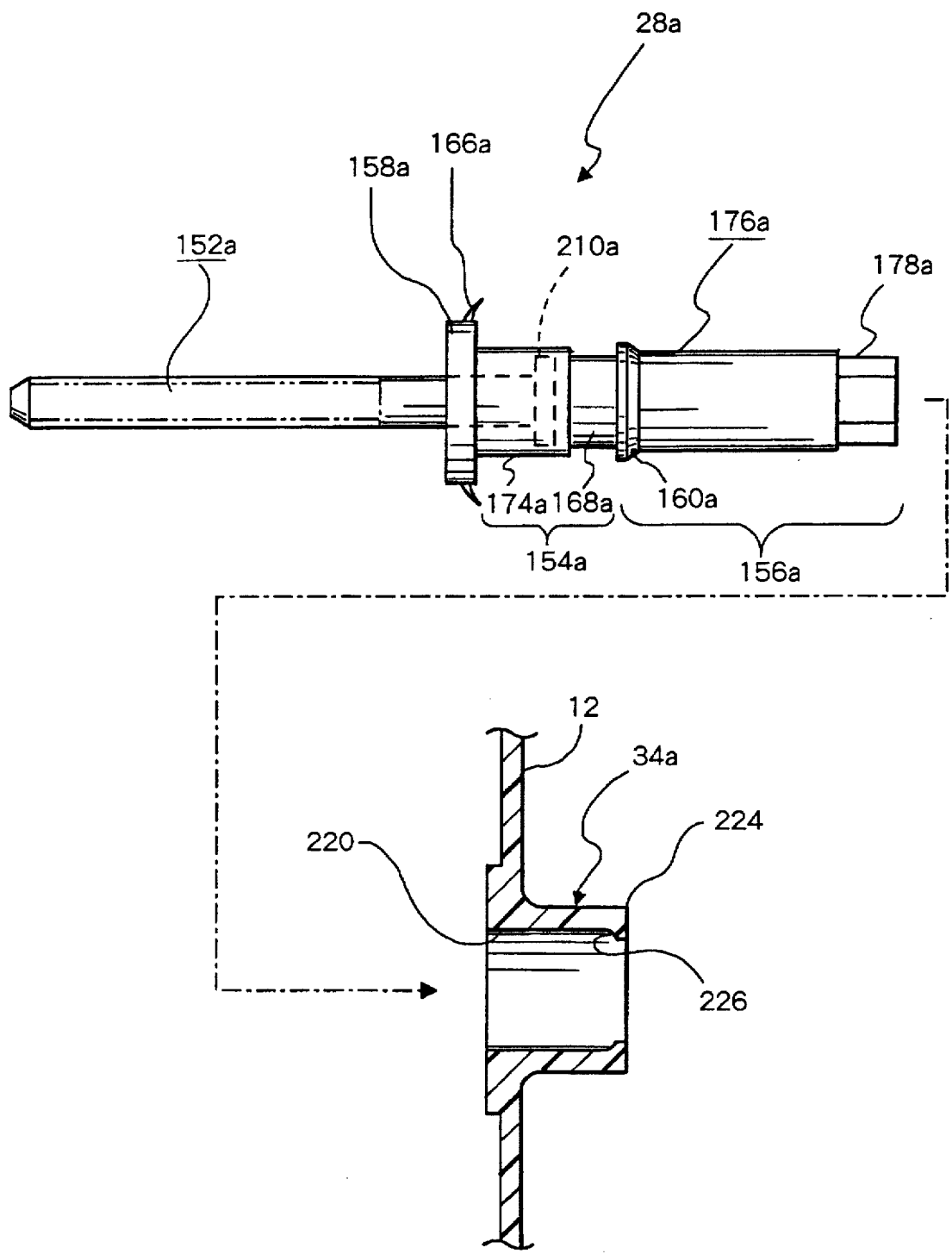
Figure 13:
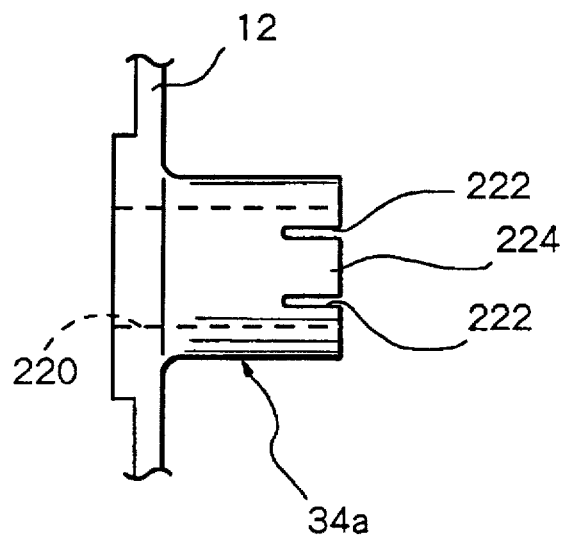

3 and showing in particular the ball-and-socket connection between the lamp body and the reflector;

FIG. 7 is an enlarged, exploded perspective view of each of the two aiming mechanisms of the headlamp;

FIG. 8 is an exploded perspective view showing the ball-and-socket connection of FIG. 6 on a still more enlarged scale;

FIG. 9 is an enlarged, fragmentary perspective view showing how the electric fighting bulb is mounted to the reflector in the headlamp of FIG. 1;

FIG. 10 is an exploded perspective of the bulb mounting shown in of FIG. 9;

FIG. 11 is a horizontal sectional view showing a modified aiming screw and a correspondingly modified bearing sleeve according to the present invention;

FIG. 12 is a view similar to FIG. 11 except that the aiming screw is shown disconnected from the bearing sleeve;

FIG. 13 is a side view of the modified bearing sleeve; and

Figure 14:
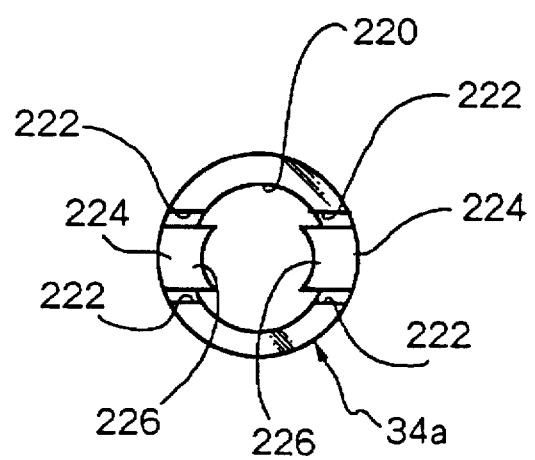

FIG. 14 is an end view of the modified bearing sleeve.

DESCRIPTION OF THE PREFERRED EMBODIMENTS

The invention will now be described in detail as embodied by way of example in the aimable vehicle headlamp shown in its entirety in FIGS. 1–4 and therein generally designated 10. The exemplified headlamp 10 has a lamp body 12 and a lens 14 which are coupled together to define a lighting chamber 16. Disposed in this lighting chamber 16 is a reflector 18 having an electric lighting bulb 20 replaceably mounted centrally thereto.

For aiming the headlamp 10 the reflector 18 is coupled to the lamp body 12 via a pivotal connection 22, a vertical aiming mechanism 24, and a horizontal aiming mechanism 26. The pivotal connection 22 is shown as a ball-and-socket joint, and each of the two aiming mechanisms 24 and 26 includes an aiming screw 28 as a primary component. The reflector 18 together with the bulb 20 is tilted vertically relative to the lamp body 12 by the vertical aiming mechanism 24, and horizontally by the horizontal aiming mechanism 26.

Figure 2:
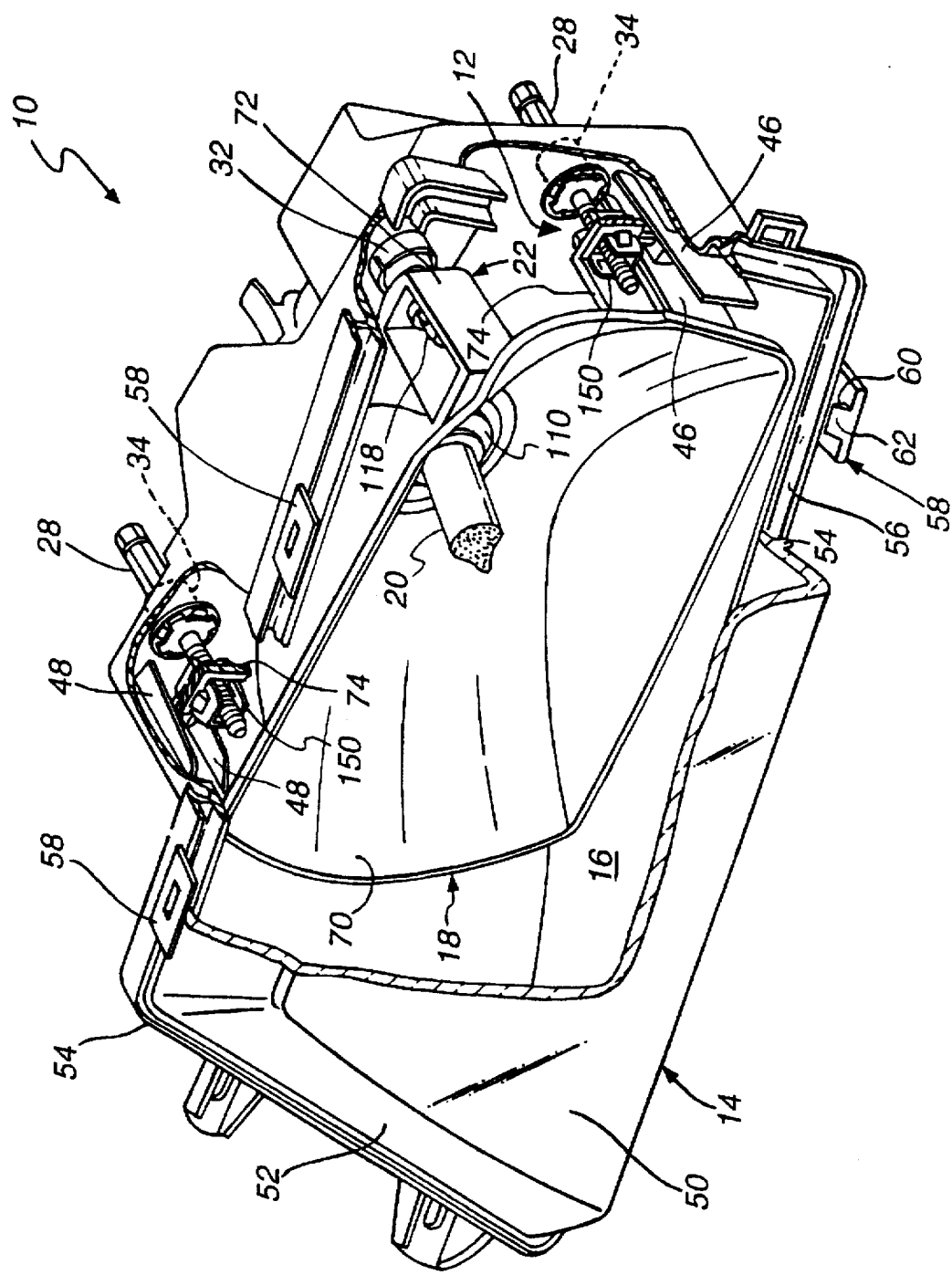
FIG. 2 is an enlarged perspective view, partly shown broken away to reveal other parts, of the headlamp.
Figure 3:
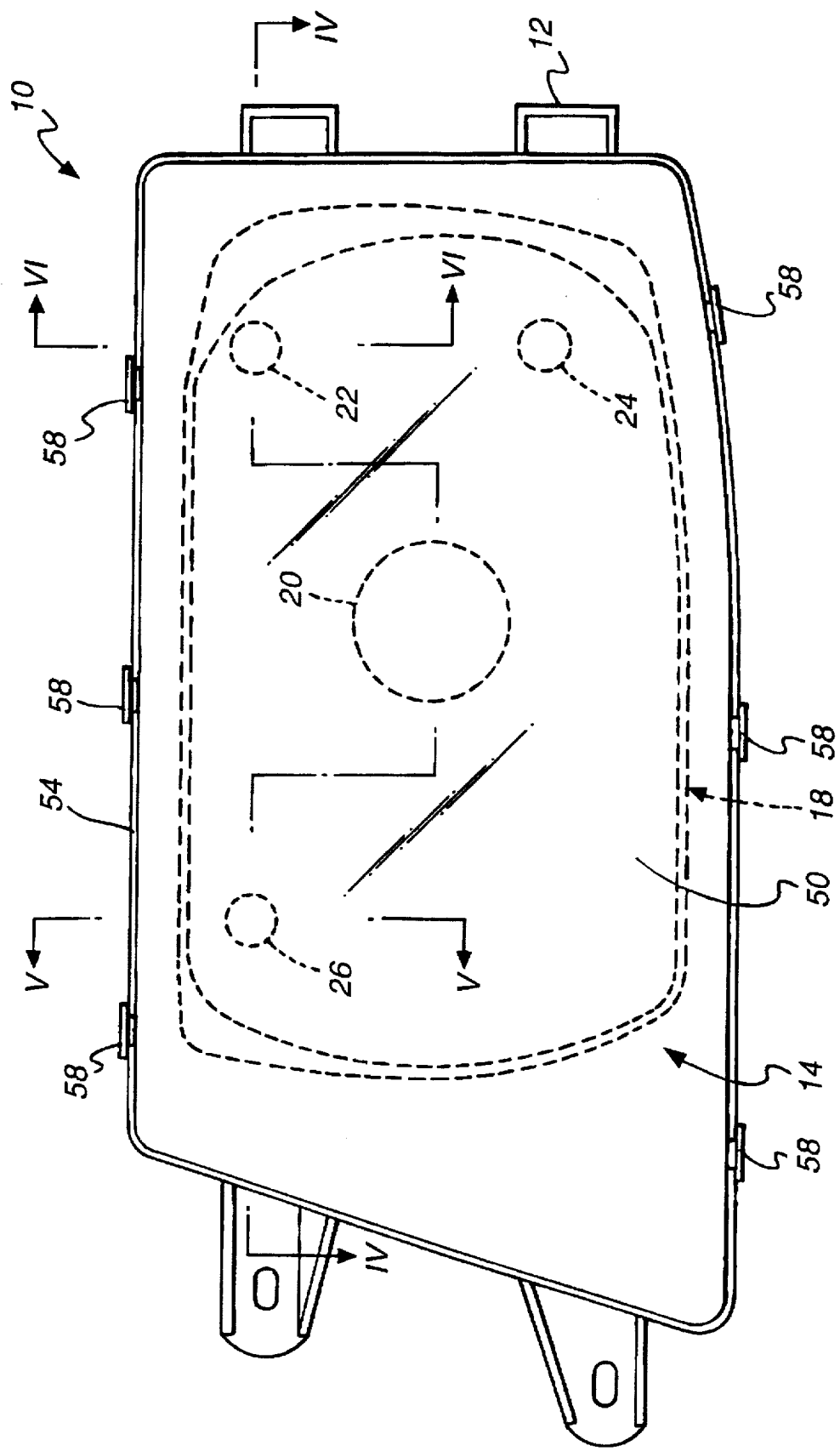
FIG. 3 is a front elevation of the headlamp.
Figure 4:
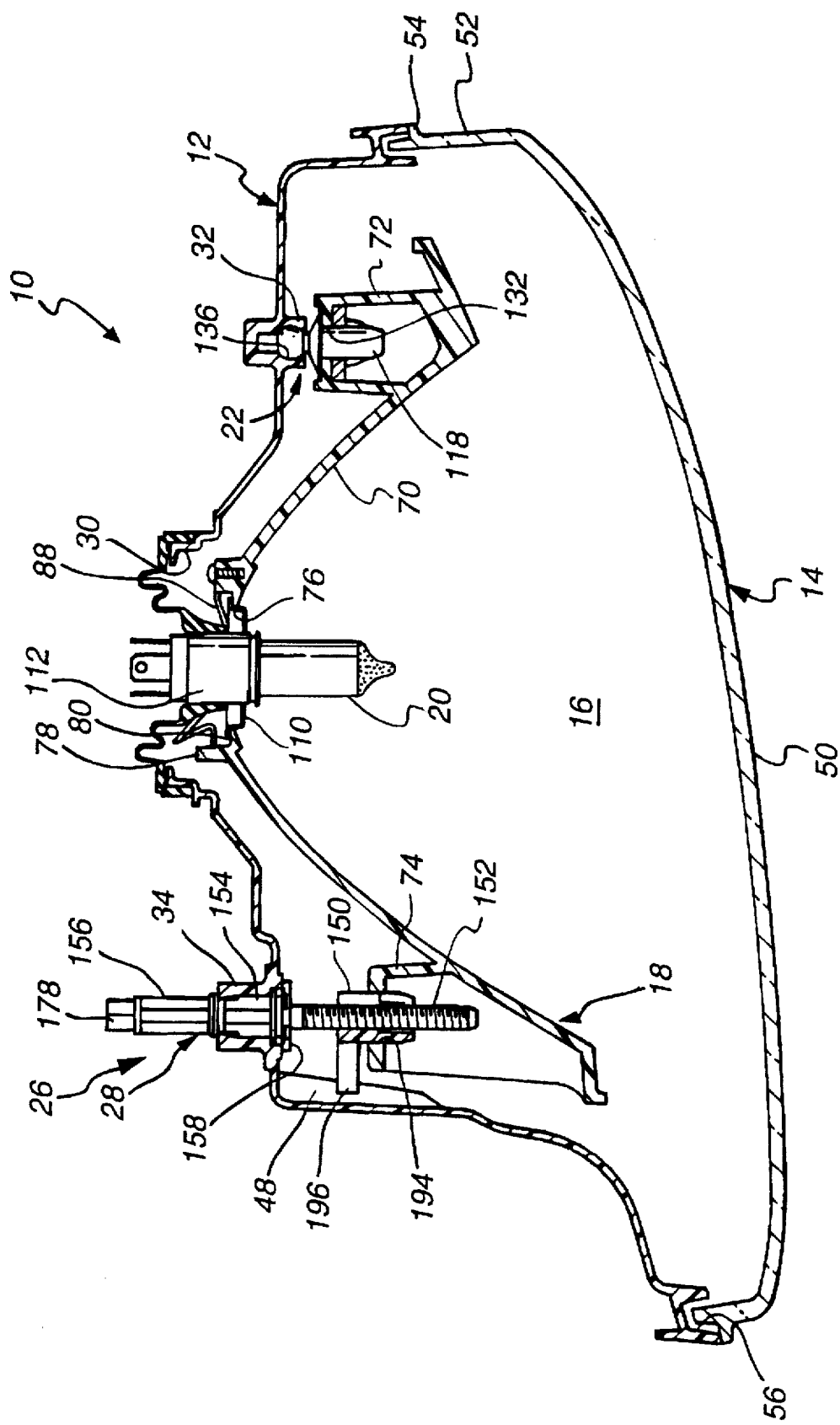
FIG. 4 is a horizontal section through the headlamp, taken along the line IV—IV in FIG. 3.

Hereinafter in this specification the directional terms such as "front" and "rear", "forward" and "rearward", as well as derivatives thereof, will be used in reference to the forward direction in which the headlamp 10 throws a beam of light, that is, toward the viewer as seen in FIG. 3 and downward as seen in FIG. 4. Thus, for example, the lamp body 12 has a closed rear end and an open from end, the latter being closed by the lens 14. The directional terms "upper" and "lower", "upward" and "downward", and derivatives thereof will be used in reference to the normal attitude, depicted in FIGS. 1 and 2, in which the headlamp 10 is to be installed on a motor vehicle. It will therefore be understood that the pivotal connection 22 is disposed adjacent the upper, right hand corner, as viewed in FIGS. 1–3, of the headlamp 10, and the vertical aiming mechanism 24 is spaced downwardly therefrom.

The following is a more detailed discussion of the lamp body 12 together with the lens 14, the reflector 18 with the bulb 20, the pivotal connection 22, and the vertical and the horizontal aiming mechanisms 24 and 26, in that order and under separate headings. How the headlamp 10 is assembled, particularly with regard to the aiming mechanisms 24 and 26, and how it is aimed, will be described following the discussion of the listed components.

Lamp Body

With reference to FIGS. 1–4 the lamp body 12 is a one-piece molding of a plastic, with a hole 30 formed centrally therein to permit the bulb 20 to extend therethrough with substantial clearance. The lamp body 12 is formed to include a socket member 32 of substantially tubular shape located adjacent the top, right hand corner of the lamp body and projecting forwardly or inwardly therefrom. The socket member 32 forms a part of the ball-and-socket connection 22 shown in detail in FIGS. 6 and 8, to which reference will be had subsequently.

Also formed on the lamp body 12 are two bearing sleeves 34, FIGS. 2 and 4, each for rotatably supporting the vertical or horizontal aiming screw 28. One of the bearing sleeves 34 is spaced downwardly from the ball-and-socket connection 22, and the other bearing sleeve horizontally therefrom, and both sleeves project rearwardly or outwardly from the back of the lamp body 12.

Figure 5:
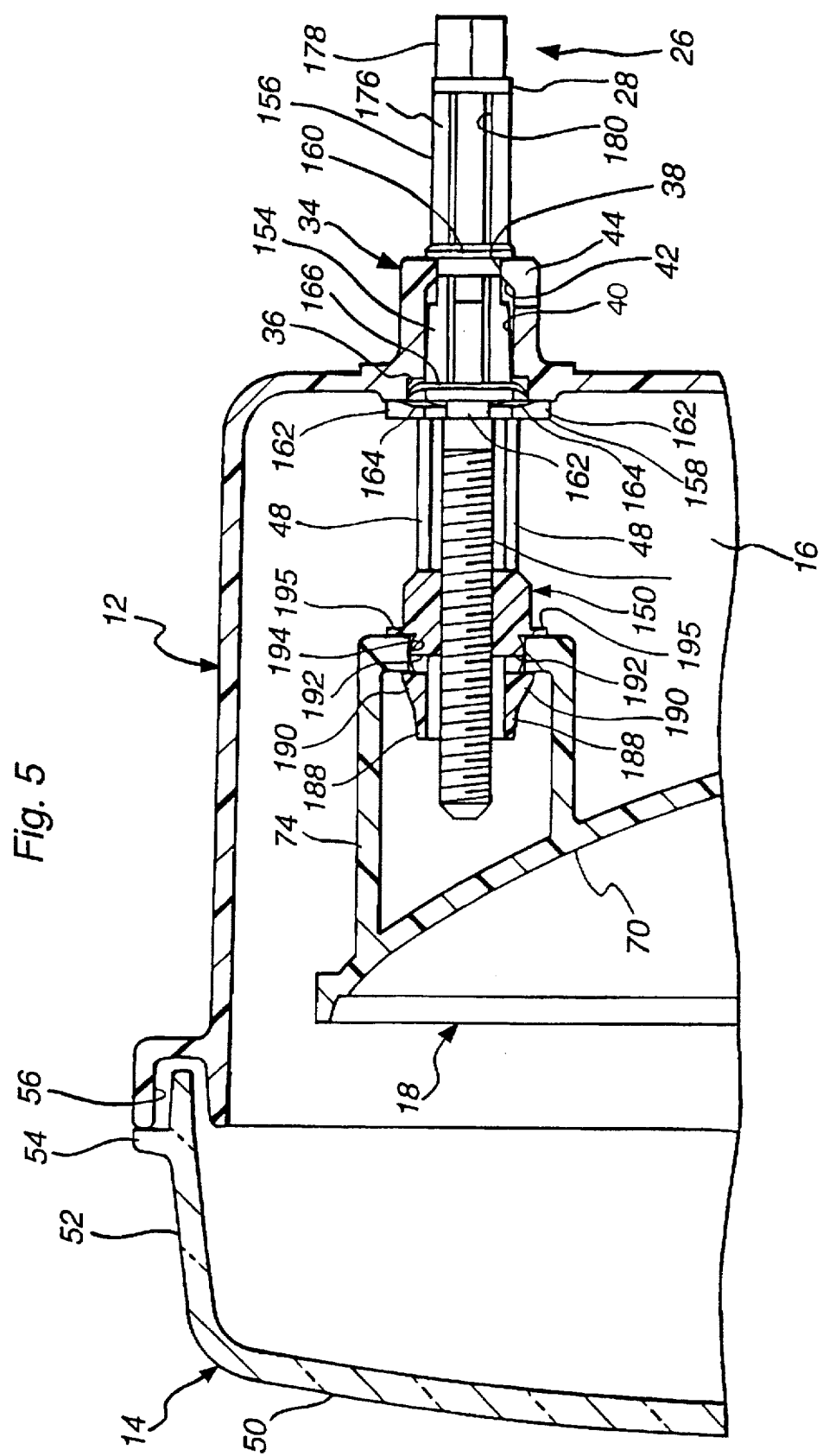
FIG. 5 is an enlarged, fragmentary vertical section through the headlamp, taken along the line V—V in FIG. 3 and showing in particular one of the aiming mechanisms.

As illustrated on an enlarged scale in FIG. 5, each bearing sleeve 34 has a from or inner end 36 open to the lighting chamber 16, and a constricted rear or outer end 38. The inside diameter of each bearing sleeve 34 is the largest at its front end 36, the smallest at its rear end 38, intermediate at its midportion 40, and tapers at its portion 42 between midportion 40 and rear end 38. A plurality (e.g. three) of slits, one seen at 44 in FIG. 5, are cut longitudinally at the rear end portion of each bearing sleeve 34, so that at least its constricted rear end 38 is elastically deformable radially outwardly.

As best revealed by FIGS. 1 and 2, the lamp body 12 is further formed to include two pairs of guide plates 46 and 48 for use in assembling the headlamp 10. The first guide plate pair 46 is located adjacent the vertical aiming mechanism 24, and the second guide plate pair 48 adjacent the horizontal aiming mechanism 26. Both guide plate pairs extend parallel to the optical axis of the headlamp 10.

With reference directed again to FIGS. 1–4 the lens 14 is formed from vitreous or plastics material to include a substantially flat major portion 50, and an annular marginal portion 52 bent rearwardly from the periphery of the major portion and having an annular rim 54 along its rear edge. This rear edge of the lens 14 is engaged in an annular mounting groove 56 formed in and along the front edge of the lamp body 12.

The lamp body 12 has a plurality of locking pawls 58 projecting forwardly from its front edge. As indicated in FIG. 2, each locking pawl 58 is formed to include a locking surface 60 normal to the front-to-rear depth direction of the headlamp 10, and another surface 62 slanting outwardly of the headlamp 10 as it extends forwardly from the locking surface 60. In assemblage, while the lens 14 is being pressed toward the lamp body 12 for engagement of the rear lens edge in the mounting groove 56 in the lamp body, the rim 54 of the lens will slide over the slanting surfaces 62 of the locking pawls 58 thereby causing these pawls to resiliently bend outwardly until, as the lens rim 54 travels past the slanting surfaces 62, the locking pawls 58 spring back into locking engagement with the lens rim.

The lens 14 can thus be affixed to the lamp body 12 by being simply pressed against the same. Preferably, a hotmelt or like adhesive or sealant may be filled in the mounting groove 56 preparatory to the engagement of the lens edge therein. Such adhesive or sealant will serve the dual purpose of reinforcing and waterproofing the joint between lens and lamp body.

Reflector

As shown also in FIGS. 1–4, the reflector 18 is molded from a plastic and has a from surface 70 rendered reflective by any known or suitable method. The reflector 18 has formed on its back a hollow boss 72, FIGS. 1, 2, 4 and 6, to serve as a part of the pivotal connection 22 between lamp body 12 and reflector 18, and two other hollow bosses 74, FIGS. 1, 2, 4, 5 and 7, to serve as parts of the aiming mechanisms 24 and 26.

FIGS. 9 and 10 show fragmentarily and on an enlarged scale the back of the reflector 18 together with the electric lighting bulb 20 in order to illustrate how the bulb is replaceably mounted to the reflector. The reflector 18 has a bulb mounting hole 76 formed centrally therein. Formed on the back of the reflector 18, an annular ridge 78 surrounds the hole 76, leaving an annular step 80 therebetween. The ridge 78 has a protuberance 82 projecting radially outwardly therefrom.

Erected on the protuberance 82 are three bearing blocks in staggered arrangement, two of which are designated 84 and the other one of which is designated 86, for pivotally supporting a bulb retainer 88. The three bearing blocks 84 and 86 are all alike in shape, but the two outer ones 84 are oriented in a direction opposite to the orientation of the intermediate one 86. The bearing blocks 84 have sloping surfaces 90, each with an indentation 92 in its front end, facing away from the bulb hole 76, and the bearing block 86 has a similar sloping surface 94, each with an indentation 96 in its front end, directed toward the bulb hole. All the sloping surfaces 90 and 94 are such that they make the bearing blocks 84 and 86 thinner as they extend rearwardly from the indentations 92 and 96. The front edges of the bearing blocks 84 are in line with each other, but that of the bearing block 86 somewhat protrudes toward the bulb hole 76 beyond the line between the front edges of the bearing blocks 84.

Made of spring wire, the bulb retainer 88 is preformed into the shape of a U, having a pair of arms 98 and a pivot 100 therebetween. The pivot 100 is rotatably engaged in the indentations 92 and 96 in the bearing blocks 84 and 86 by being pressed down their sloping surfaces 90 and 94. Although the bearing block 86 partly intrudes between the bearing blocks 84 as aforesaid, the pivot 100 of the bulb retainer 88 will nevertheless be received in the indentations 92 and 94 by virtue of its own deflection and that of the bearing blocks 84 and 86. The free ends 102 of the bulb retainer arms 98 are positively engaged with respective hooks 104 formed in recesses 106 in the annular ridge 78 on the reflector 18.

The midportions 108 of the bulb retainer arms 98 are resiliently held against a flange 110 on the base 112 of the bulb 20, the bulb flange being held in turn against the annular step 80 of the reflector 18 as the bulb 20 is inserted forwardly in the bulb mounting hole 7(5. The bulb flange 110 is shown to have three positioning tongues 114 extending radially therefrom for engagement in recesses 116 in the annular ridge 78 on the reflector 18. The bulb 20 is therefore dismountable from the reflector 18 merely by disengaging the bulb retainer arms 98 from the hooks 104.

Pivotal Connection

FIGS. 6 and 8 best illustrate the pivotal connection 22 between lamp body 12 and reflector 18. The connection 24 is shown as a ball-and-socket joint comprising a ball member 118 on the reflector 18 and the noted socket member 32 on the lamp body 12. The ball member 118 is a one-piece molding of polyacetal or like rigid plastic, having a ball 120 and a hollow stem 122 joined to each other via a flaring flange 124. The ball stem 122 has a pair of retractable locking pawls 126 formed in diametrically opposite positions thereon. Each locking pawl 126 has a surface 128 normal to the axis of the ball stem 122, and another surface 130 that slants toward the axis of the ball stem as it extends forwardly.

The ball stem 122 is inserted in a hole 132 in the hollow boss 72 on the reflector 18 from its rear side. During such insertion the pair of locking pawls 126 will retract into the hollow stem 122 while traveling through the hole 132 and, on emerging from the hole, spring back to engage the rear wall 134 of the hollow boss 72 between themselves and the flaring flange 124.

The socket member 32 defines a socket 136 opening forwardly via an entrance opening 138. The diameter of this entrance opening 138 is less than that of the socket 136 at its rear end, gradually increases as it extends forwardly, and becomes greater than the socket diameter at its front end. The socket member 32 has its front end portion slitted longitudinally as at 140 in FIG. 8.

Thus the lamp body 12 and the reflector 18 can be pivotally coupled together by forcing the ball 120 into the socket 136 via the entrance opening 138. The socket member 32 will radially expand during the ball insertion and, upon full insertion of the ball, spring back to rotatably grip the ball as shown in FIG. 6. The reflector 18 is now pivotable about the center of the ball 120 in any direction within limits relative to the lamp body 12.

Aiming Mechanisms

The vertical aiming mechanisms 24 and horizontal aiming mechanism 26, to which the present invention specifically pertains, are mostly, not exactly, alike in construction, so that the description of one applies to the other except where otherwise indicated. As illustrated in detail in FIGS. 5 and 7, each aiming mechanism 24 or 26 comprises the noted aiming screw 28 and a nut 150 in threaded engagement with each other. The aiming screw 28 is rotatably supported by the bearing sleeve 34 formed in one piece with the lamp body 12 whereas the nut 150 is mounted fast to the back of the reflector 18. The aiming screw 28 and nut 150 will be described in detail in that order.

Molded from a plastic such as, preferably, nylon 6, the aiming screw 28 integrally comprises a threaded shank 152 disposed in the lighting chamber 16 and engaged with the nut 150 on the back of the reflector 18, a journal 154 joined collinearly to the threaded shank and rotatably received in the bearing sleeve 34, and a head portion 156 joined collinearly to the journal and projecting outwardly or rearwardly of the bearing sleeve. Further the aiming screw 28 is formed to include a first collar 158 between threaded shank 152 and journal 154, and a second collar 160 between journal 154 and head portion 156.

Preferably, and as best depicted in FIG. 7, the first collar 158 on the aiming screw 28 may be comprised of a plurality of rigid lugs 162 formed at constant circumferential spacings on the screw, and a plurality of elastic lugs 164 also formed at constant circumferential spacings on the screw and arranged alternately with the rigid lugs 162. The elastic lugs 164 are inclined rearwardly beyond the rear sides of the rigid lugs 162. The diameters of the lugs 162 and 164 are both greater than the inside diameter of the bearing sleeve 34. Consequently, when the aiming screw 28 is inserted rearwardly, its head portion 156 foremost, into and through the bearing sleeve 34, the lugs 162 and 164 come into abutment against the inner end of the bearing sleeve as in FIG. 5. Inclined rearwardly, the elastic lugs 164 function to take up looseness between aiming screw 28 and bearing sleeve 34.

The second collar 160 on the aiming screw 28 has a diameter more than the inside diameter of the constricted rear end 38 of the bearing sleeve 34 but not more than that of its midportion 40. Therefore, when the aiming screw 28 is being inserted as above into and through the bearing sleeve 34, the second collar 160 can pass its constricted rear end 38 as this end portion of the bearing sleeve expand radially owing to the slits 44 cut therein. On emerging from the bearing sleeve 34, the second collar 160 will coact with the first collar 158 to engage the bearing sleeve therebetween, restraining the aiming screw from axial displacement in either direction relative to the bearing sleeve 34.

Preferably, and as shown in both FIGS. 5 and 7, a sealing ring 166 should be formed on the aiming screw 28 just behind the first collar 158. The sealing ring should have a diameter somewhat more than the inside diameter of the front end 36 of the bearing sleeve 34 and be made thinner as it extends radially outwardly. When the aiming screw 28 is supported properly by the bearing sleeve 34 as in FIG. 5, the sealing ting 166 will be compressed in its front end 36, watertightly sealing the joint between screw and sleeve.

All but the rear end portion 168 of the journal 154 of the aiming screw 28 has a plurality of, four in the illustrated embodiment, grooves 170 formed longitudinally therein at constant circumferential spacings, so that the journal is mostly shaped like a cross in cross section. The rear end portion 168 of the journal 154 has a diameter approximately equal to the inside diameter of the constricted rear end 38 of the bearing sleeve 34. The midportion 172 of the journal 154 has a diameter less than that of its rear end portion 168. The front portion 174 of the journal 154 has a diameter greater than that of its rear end portion 168 and approximately equal to the inside diameter of the midportion 40 of the bearing sleeve 34.

The head portion 156 of the aiming screw 28 comprises a stud 176 joined to the second collar 160, and a hexagon head 178 on the rear end of the stud. The stud 176 is shown to have four grooves 180 cut longitudinally therein at constant circumferential spacings. The maximum diameter of the head portion 156 should not exceed the inside diameter of the bearing sleeve 34.

The vertical and horizontal aiming screws 28 of the foregoing construction are engaged with the nuts 150, also shown in detail in FIGS. 5 and 7, which are mounted fast to the hollow bosses 74 on the back of the reflector 18. A one-piece molding of nylon 6 or the like, each nut 150 has a tapped hole 182 extending therethrough for engagement with the threaded shank 152 of the aiming screw 28. The full length of the tapped hole 182 is open to the outside of the nut 150 via a cutout 184 bounded by a pair of oppositely sloping surfaces 186 which make the cutout wider as it extends away from the tapped hole. The aiming screw 28 is to be engaged with the nut 150 by being laterally forced into the tapped hole 182 through the cutout 184, instead of being turned into the nut, as will be later explained in more detail.

Extending forwardly from the nut 150 in parallel spaced relationship to each other, a pair of mounting walls 188 have each a retractable locking pawl 190 projecting laterally outwardly therefrom. All but the front side of each locking pawl 190 are surrounded by slits 192, so that the locking pawls are retractable into the mounting walls 188 while these walls are being forced into a mounting hole 194 in the boss 74. The locking pawls 190 will spring back to their normal positions when the nut is inserted in the mounting hole 194 until two pairs of abutments 195 on the nut come to butt on the rear wall of the hollow boss 74, with the consequent engagement of this rear wall between locking pawls 190 and abutments 195. Preferably, and as indicated in FIG. 7, the front surfaces 197 of each aligned pair of abutments 195 should slope rearwardly as they extend away from their meeting ends.

The nut 150 is formed integral with a pair of legs 196 extending from one side 198 of the nut and having semicylindrical surfaces 200 directed away from each other. As will be understood from a consideration of FIGS. 1 and 2, the legs 196 of the nut 150 of the vertical aiming mechanism 24 are slidably received between the pair of guide plates 46 which are formed on the lamp body 12 with a horizontal spacing therebetween. The legs 196 of the nut 150 of the horizontal aiming mechanism 26 are slidably received between the pair of guide plates 48 which are formed on the lamp body 12 with a vertical spacing therebetween.

Coupling of Aiming Screws and Nuts

As will be best understood from FIG. 7, for engaging each aiming screw 28 with one of the nuts 150, the threaded shank 152 of the screw may first be held against the pair of oppositely sloping cutout surfaces 186 oft he nut. Then the shank 152 may be pressed deeper into the cutout 184 thereby causing the nut 150 to expand elastically until the shank becomes received in the tapped hole 182. The nut 150 will contract to its normal shape upon engagement of the shank 152 in the tapped hole 182. The aiming screw 28 can thus be engaged with the nut 150 far more readily than by being turned into the nut.

Mounting of Nuts to Reflector

Reference is directed to FIGS. 5 and 7 for a discussion of how the nuts 150 are mounted to the reflector 18 after having been engaged with the aiming screws 28 as above. The pair of mounting walls 188 of each nut 150 may be inserted into the mounting hole 194 in one of the hollow bosses 74 on the back of the reflector 18. The locking pawls 190 will resiliently retract into the mounting walls 188 while traveling in sliding contact with the rear wall of the hollow boss 74, and spring back upon full insertion of the nut in the boss 74, engaging the rear end of the boss between themselves and the two pairs of abutments 195 on the nut.

The noted slits 192 around the locking pawls 190 are not absolutely necessary. The locking pawls will enter the hollow boss 74 as the pair of mounting walls 188 themselves resiliently deflect toward each other, and engage the rear wall of the boss as the mounting walls subsequently regain their normal positions.

Mounting of Aiming Screws to Lamp Body

As best seen in FIG. 5, each aiming screw 28 may be inserted, its head 178 foremost, in and through one of the bearing sleeve 34 on the lamp body 12 from its from or inner end. The second collar 160 on the aiming screw 28 will be smoothly admitted into the bearing sleeve 34 just before its tapering portion 42. The rear end portion of the bearing sleeve 34 will elastically expand radially, thanks to the slits 44, as the second collar 160 travels past the tapering portion 42 and constricted rear end 38 of the bearing sleeve. The rear end portion of the bearing sleeve 34 will return to its normal diameter when the second collar 160 emerges from its rear end.

Thus the aiming screw 28 is restrained from axial displacement in either direction relative to the lamp body 12 as the bearing sleeve 34 is caught between the collars 158 and 160 on the aiming screw. Any looseness between aiming screw 28 and bearing sleeve 34 is taken up by the elastic lugs 164 which, together with the rigid lugs 162, make up the first collar 158. Thus, all that is required for mounting the aiming screw 28 to the lamp body 12 is to insert the screw rearwardly in and through the bearing sleeve 34.

It is also to be appreciated that the journal 154 of the aiming screw 28 is well calculated to be rotatably supported within the bearing sleeve 34 in a very stable manner. As has been set forth with reference to FIGS. 5 and 7, the rear end portion 168 of the journal 154 has a diameter approximately equal to the inside diameter of the constricted rear end 38 of the bearing sleeve 34. The front portion 174 of the journal 154 also has a diameter approximately equal to the inside diameter of the midportion 40 of the bearing sleeve 34. But the midportion 172 of the journal 154 has a diameter less than that of its rear end portion 168 or front portion 174, so that this midportion is out of contact with the bearing sleeve. The aiming screw 28 is stably supported as only its opposite end portions 168 and 174 make sliding contact with the bearing sleeve 34.

It is also to be noted that the joint between aiming screw 28 and bearing sleeve 34 is watertightly closed as the elastic collar 166 is received in a compressed state in the front end 36 of the bearing sleeve. The sealing collar 166 is formed in one piece with the aiming screw 28, so that no separate sealing ring or other means is required.

Mounting of Reflector to Lamp Body

There are two possible methods of mounting the reflector 18 to the lamp body 12. According to one of them, the two aiming screws 28 may first be engaged as above with the respective nuts 150. Then the aiming screws 28 may be mounted as above to the lamp body 12, with the legs 196 of the nut 150 of the vertical aiming mechanism 24 received between the pair of guide plates 46, and the legs 196 of the nut 150 of the horizontal aiming mechanism 26 received between the pair of guide plates 48. Also, the ball member 118 of the ball-and-socket joint 22 may be mounted to the boss 72 on the reflector 18 in a manner that has been explained with reference to FIG. 6.

Then the reflector 18 may be held in position with respect to the lamp body 12, with the ball 120 of the ball member 118 partly received in the entrance opening 138 of the socket member 32 on the lamp body, and the pairs of mounting walls 188 of the nuts 150 partly received in the mounting holes 194 in the hollow bosses 74 on the reflector. Then the lamp body 12 and the reflector 18 may be pressed toward each other. The mounting of the reflector 18 to the lamp body 12 will be completed simply as the ball 120 is engaged in the socket 136, as shown in FIG. 6, and as the nuts 150 are engaged wit the hollow bosses 74, as shown in FIG. 5.

Another method is such that the nuts 150, engaged as above with the aiming screws 28, and the ball member 118 may first be both mounted to the reflector 18 in the manners set forth previously. Then the reflector 18 may be held in position with respect to the lamp body 12, with the head portions 156 of the aiming screws 28 partly received in the bearing sleeves 34 on the lamp body, the legs 196 of the nuts 150 engaged in the respective pairs of guide plates 46 and 48 on the lamp body, and the ball 120 partly received in the entrance opening 138 of the socket member 32 on the lamp body. Then the lamp body 12 and the reflector 18 may be pressed toward each other, whereupon the aiming screws 28 will have their journals 154 supported in the bearing sleeves 34, and the ball 120 in the socket 136. Thus the coupling of the lamp body 12 and reflector 18 may be completed.

Aiming Operations

For vertically aiming the headlamp 10, the aiming screw 18 of the vertical aiming mechanism 24 may be revolved in either direction. The bidirectional rotation of the vertical aiming screw 18 will be translated into the linear travel of the nut 150 back and forth along the screw. The reflector 18 together with the bulb 20 thereon will then tilt approximately about an axis passing through the center of the ball 120 of the pivotal connection 22 and the connection between the boss 74 and nut 150 of the horizontal aiming mechanism 26. Thus the aim of the headlamp 10 is adjustable vertically.

The bi-directional rotation of the aiming screw 28 of the horizontal aiming mechanism 26, on the other hand, will result in the linear travel of the nut 150 back and forth along the screw. The reflector 18 together with the bulb 20 thereon will then tilt approximately about an axis extending through the center of the ball 120 and the connection between the boss 74 and nut 150 of the vertical aiming mechanism 24. The aim of the headlamp 10 is therefore adjustable horizontally.

During the foregoing aiming operations the nuts 150 will travel exactly along predetermined paths as their legs 196 move in sliding contact with the guide plates 46 and 48. Thus retrained by the guide plates 46 and 48 from moving in directions other than the front-to-rear depth direction of the headlamp 10, the nuts 150 will exert hardly any torsional stresses on the aiming screws. This advantage becomes all the more pronounced because the nut 150 of the vertical aiming mechanism 24 is restrained from horizontal displacement by being caught between the pair of horizontally spaced guide plates 46, and because the nut 150 of the horizontal aiming mechanism 26 is restrained from vertical displacement by being caught between the pair of vertical spaced guide plates 48. The aiming screws 28 may therefore be fabricated from plastics without the danger of breakage or damage.

Alternate Embodiment

FIGS. 11 and 12 show a modified aiming screw 28a together with a correspondingly modified bearing sleeve 34a on the lamp body 12, the modified aiming screw and bearing sleeve being capable of use as parts of either a vertical or a horizontal aiming mechanism in vehicle headlamps such as the one shown in FIGS. 1-4. The modified aiming screw 28a comprises a threaded shank 152a, a journal 154a, and a head portion 156a. A first collar 158a is formed between threaded shank 152a and journal 154a, and a second collar 160a between journal 154a and head portion 156a. The first collar 158a has a sealing ring 166a formed concentrically on its circumference. The sealing ring 166a is thinner than the first collar 158a and grows even thinner as it extends radially outwardly and is generally inclined rearwardly.

Unlike the first disclosed aiming screw 28 the modified aiming screw 28a has its threaded shank 152a made from metal, and its journal 154a and head portion 156a molded from a synthetic resin. The metalmade shank 152a has an enlarged rear end 210 which is embedded in the journal 154a. The fabrication of plastics moldings integral with metalmade parts are known as insert molding in the art. Preferably, the enlarged end 210 of the threaded shank 152a should be hexagonal or otherwise polygonal or noncircular in shape so that the rotation of the head portion 156a of the aiming screw 28a may be infallibly transmitted to the threaded shank 152a.

The modified aiming screw 28a is rotatably supported by the bearing sleeve 34a which is shown also in FIGS. 13 and 14. The bearing sleeve 34a has a hole 220 of constant diameter extending therethrough. Two pairs of parallel flits 222 are formed in a rear end portion of the bearing sleeve 34a, defining a pair of diametrically opposed, deflectable portion 224 which have inside surfaces 226 which gradually protrude toward each other as they extend rearwardly. In essence, therefore, the pair of sleeve portions 224 serves to provide a constricted rear end of the bearing sleeve 34a like the constricted rear end 38, FIG. 5, of the first disclosed bearing sleeve 34.

The first collar 158a on the modified aiming screw 28a has a diameter greater than the inside diameter of the bearing sleeve 34a. The second collar 160a has a diameter greater than the minimum spacing between the pair of rear end portions 224 of the bearing sleeve 34a but not greater than its inside diameter. The front portion 174a of the journal 154a has a diameter approximately equal to the inside diameter of the bearing sleeve 34a, and the rear portion 168a of the journal 154a has a diameter approximately equal to the minimum spacing between the pair of rear end portions 224 of the bearing sleeve 34a. The head portion 156a comprises a stud 176a having a diameter not greater than the inside diameter of the bearing sleeve 34a, and a hexagon head 178a shown to be less in diameter than the stud 176a.

It is therefore apparent that the modified aiming screw 28a can also be inserted, its head 178a foremost, into the bearing sleeve 34a from its front or inner end. The pair of opposed rear end portions 224 of the bearing sleeve 34a will elastically spread apart from each other as the second collar 160a on the aiming screw travels past them, and return to their normal positions as the second collar emerges from the rear end of the bearing sleeve.

Thus, the aiming screw 28a is restrained from axial displacement in either direction relative to the lamp body 12 as the collars 158a and 160a on the aiming screw engage the bearing sleeve 34a therebetween. The sealing ring 166a on the first collar 158a will be held against the inside surface of the lamp body 12 for watertightly sealing the joint between aiming screw and bearing sleeve, as well as for taking up possible looseness therebetween. Alternatively, the sealing ring 166a might be replaced by a plurality of discrete radial projections formed at circumferential spacings on the first collar 158a, and a separate sealing ring might be provided between bearing sleeve 34a and screw journal 154a.

The screw threads on the shanks 152a of the aiming screws are most susceptible to wear and damage, so that only the shank is metal made in this alternate embodiment for a longer useful life and smoother rotation of the aiming screws.

Notwithstanding the foregoing detailed disclosure, it is not desired that the present invention be limited by the exact details of the illustrated embodiment. A variety of additional modifications, alterations or adaptations of the illustrated embodiment will suggest themselves to one skilled in the art, in order to conform to design preferences or to meet the requirements of each specific application of the invention, without departure from the proper scope or fair meaning of the subjoined claims.

What is claimed is:

1. In an aimable vehicle headlamp having a lamp body and a lens coupled together to define a lighting chamber, a reflector disposed in the lighting chamber and having a light source mounted thereto, a pivotal connection between the lamp body and the reflector, and first and second aiming means for tilting the reflector relative to the lamp body in two orthogonal directions, an improvement in each of the first and the second aiming means comprising:

(A) nut means on the reflector;

(B) a bearing sleeve formed on the lamp body, the bearing sleeve having a predetermined inside diameter, an inner end open to the lighting chamber and a constricted outer end directed away from the lighting chamber, the constricted outer end having an inside diameter smaller than the predetermined inside diameter of the bearing sleeve, at least the constricted outer end of the bearing sleeve being elastically deformable in a radially outward direction; and (C) an aiming screw comprising:
  (a) a threaded shank to be disposed in the lighting chamber and threadedly engageable with the nut means on the reflector;
  (b) a journal joined to the threaded shank and rotatably receivable in the bearing sleeve;
  (c) a head portion joined to the journal and projectable from the constricted outer end of the bearing sleeve, the head portion having a diameter not greater than the inside diameter of the bearing sleeve;
  (d) a first collar located between the threaded shank and the journal and having a diameter greater than the inside diameter of the bearing sleeve, the first collar being held against the inner end of the bearing sleeve when the headlamp is assembled; and
  (e) a second collar located between the journal and the head portion and having a diameter not greater than the inside diameter of the bearing sleeve and greater than the inside diameter of the constricted outer end of the bearing sleeve;

(D) whereby, in the assemblage of the headlamp, the head portion of the aiming screw can be inserted into and through the bearing sleeve on the lamp body from the inner end of the bearing sleeve until the bearing sleeve is retained between the first and the second collars of the aiming screw.

2. The aimable vehicle headlamp of claim 1 wherein the journal of the aiming screw comprises:

(a) a first portion adjacent the first collar having a diameter approximately equal to the inside diameter of the bearing sleeve;

(b) a second portion adjacent the second collar having a diameter approximately equal to the inside diameter of the constricted outer end of the bearing sleeve; and (c) a third portion between the first and the second portions having a diameter less than the inside diameter of the bearing sleeve;

(d) whereby the journal can slidably contact the bearing sleeve at the first and the second portions only.

3. The aimable vehicle headlamp of claim 1 wherein the aiming screw is further formed to include elastic means between the threaded shank and the journal, the elastic means being held against the inner end of the bearing sleeve for taking up possible looseness between the bearing sleeve and the aiming screw when the headlamp is assembled.

4. The aimable vehicle headlamp of claim 1 wherein the first collar of the aiming screw comprises:

(a) a plurality of rigid lugs formed at constant circumferential spacings on the aiming screw; and (b) a plurality of elastic lugs formed at constant circumferential spacings on the aiming screw and arranged alternately with the rigid lugs, the elastic lugs being inclined toward the second collar for taking up possible looseness between the bearing sleeve and the aiming screw.

5. The aimable vehicle headlamp of claim 1 wherein the aiming screw is further formed to include sealing means for watertightly sealing a joint between the aiming screw and the bearing sleeve.

6. The aimable vehicle headlamp of claim 5 wherein the sealing means comprises an elastic sealing ring formed between the first collar and the journal, the sealing ring having a diameter greater than the inside diameter of the bearing sleeve and being elastically receivable in the bearing sleeve.

7. The aimable vehicle headlamp of claim 5 wherein the sealing means comprises an elastic sealing ring formed on the first collar and held against the inner end of the bearing sleeve when the headlamp is assembled.

8. The aimable vehicle headlamp of claim 1 wherein the bearing sleeve has a plurality of slits formed therein to permit radial expansion of the constricted outer end thereof.

9. The aimable vehicle headlamp of claim 1 wherein the bearing sleeve has two pairs of circumferentially spaced slits formed in an outer end portion thereof in order to provide a pair of diametrically opposed, elastically deformable sleeve portions, the pair of sleeve portions growing thicker to reduce a spacing therebetween as they extend toward the outer end of the bearing sleeve.

10. The aimable vehicle headlamp of claim 1 wherein the threaded shank of the aiming screw is made of metal and the journal, head portion, first collar and second collar of the aiming screw are made from a synthetic resin.

* * * * *